United States Patent [19]

Mueller

[11] Patent Number: 4,532,189

[45] Date of Patent: Jul. 30, 1985

[54] LINEAR POLYETHYLENE SHRINK FILMS

[75] Inventor: Walter B. Mueller, Taylors, S.C.

[73] Assignee: W. R. Grace & Co., Cryovac Div., Duncan, S.C.

[21] Appl. No.: 553,230

[22] Filed: Nov. 18, 1983

Related U.S. Application Data

[63] Continuation of Ser. No. 350,459, Feb. 19, 1982, abandoned.

[51] Int. Cl.$^3$ .................................... B32B 7/02
[52] U.S. Cl. .................................... 428/516; 428/518; 428/520; 428/910; 428/913; 428/451; 428/347; 264/176 R
[58] Field of Search ........................ 428/516

[56]  References Cited

U.S. PATENT DOCUMENTS

| | | | |
|---|---|---|---|
| 3,212,635 | 10/1965 | Dreyfus | 206/65 |
| 3,524,795 | 8/1970 | Peterson | 428/216 |
| 3,595,735 | 7/1971 | Tyrrell | 156/144 |
| 3,937,758 | 2/1976 | Castagna | 260/876 B |
| 4,076,698 | 2/1978 | Anderson | 526/348.6 |
| 4,147,827 | 4/1979 | Breidt | 428/218 |
| 4,151,318 | 4/1979 | Marshall | 428/35 |
| 4,188,441 | 2/1980 | Cook | 428/516 |
| 4,194,039 | 3/1980 | Mueller | 428/213 |
| 4,199,638 | 4/1980 | McKee | 428/516 |
| 4,205,021 | 5/1980 | Morita | 525/240 |
| 4,226,946 | 10/1980 | Park | 521/98 |
| 4,261,473 | 4/1981 | Yamada | 428/35 |
| 4,277,578 | 7/1981 | Yoshimura | 525/211 |
| 4,303,763 | 12/1981 | Beasley | 525/313 |
| 4,321,229 | 3/1982 | Blakeslee | 264/349 |
| 4,329,313 | 5/1982 | Miller | 264/349 |
| 4,330,501 | 5/1982 | Jones | 264/566 |
| 4,343,755 | 8/1982 | Miller | 264/176 R |
| 4,348,349 | 9/1982 | Kurtz | 264/564 |
| 4,354,997 | 10/1982 | Mizutani | 264/560 |
| 4,360,494 | 11/1982 | Kurtz | 264/564 |
| 4,363,841 | 12/1982 | Snow | 428/35 |
| 4,374,227 | 2/1983 | Michie | 524/528 |
| 4,379,190 | 4/1983 | Schenck | 428/95 |
| 4,387,188 | 6/1983 | Statz | 524/494 |
| 4,390,385 | 6/1983 | Ferguson et al. | 428/516 X |
| 4,397,982 | 8/1983 | Boutni | 524/493 |
| 4,407,874 | 10/1983 | Gehrke | 428/516 X |
| 4,409,364 | 10/1983 | Schmuckler | 525/74 |
| 4,412,025 | 10/1983 | Corwin | 524/241 |
| 4,415,707 | 11/1983 | Blanchard | 525/231 |
| 4,418,841 | 12/1983 | Eckstein | 222/107 |
| 4,419,473 | 12/1983 | Mahaffey | 524/104 |
| 4,420,580 | 12/1983 | Herman | 524/424 |
| 4,421,867 | 12/1983 | Nojiri | 521/82 |
| 4,424,243 | 1/1984 | Nishimoto | 428/36 |
| 4,425,044 | 1/1984 | Kurtz | 366/79 |
| 4,425,268 | 1/1984 | Cooper | 524/110 |
| 4,426,029 | 1/1984 | Kamp | 225/49 |
| 4,426,498 | 1/1984 | Inoue | 525/240 |
| 4,430,289 | 2/1984 | McKinney | 264/564 |
| 4,430,476 | 2/1984 | Liu | 525/67 |
| 4,434,258 | 2/1984 | Schumacher | 524/13 |
| 4,438,228 | 3/1984 | Schenck | 524/109 |
| 4,438,238 | 3/1984 | Fukushima | 525/240 |
| 4,440,911 | 4/1984 | Inoue | 525/301 |
| 4,444,828 | 4/1984 | Anthony | 428/218 |
| 4,449,014 | 5/1984 | Brezinsky | 174/107 |

FOREIGN PATENT DOCUMENTS

0002606A1  6/1979  European Pat. Off. .

OTHER PUBLICATIONS

Modern Plastics Encyclopedia, 1982–1983, pp. 76, 77.

Primary Examiner—Patricia C. Ives
Attorney, Agent, or Firm—John J. Toney; William D. Lee, Jr.; Mark B. Quatt

[57]  ABSTRACT

A multi-layered thermoplastic film having improved physical characteristics is formulated through utilization of a linear low density polyethylene or linear medium density polyethylene resin as a core and/or an intermediate layer constituent.

14 Claims, 2 Drawing Figures

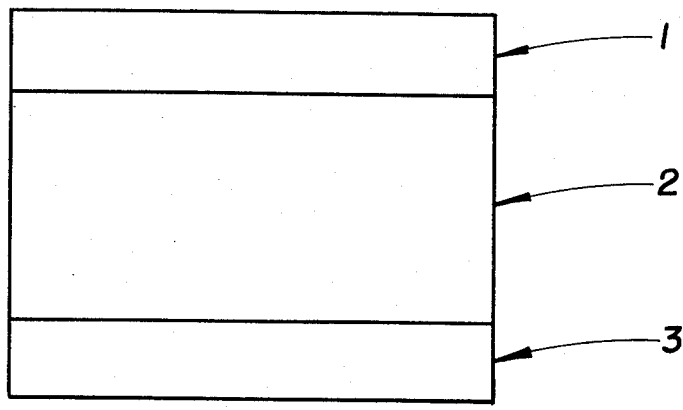
FIGURE I
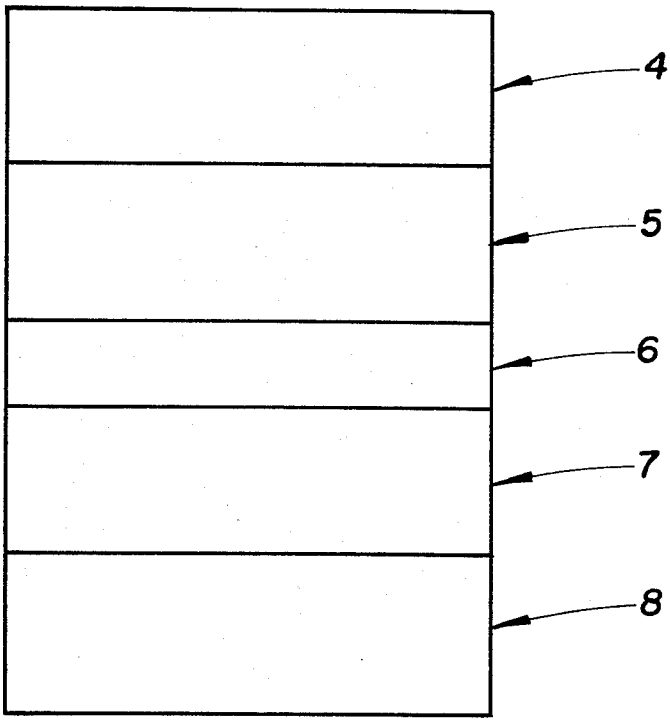
FIGURE II

LINEAR POLYETHYLENE SHRINK FILMS

This is a continuation application of application Ser. No. 350,459, filed on Feb. 19, 1982, now abandoned.

FIELD OF THE INVENTION

This invention relates to heat shrinkable, thermoplastic packaging films. In particular, the present invention is directed to shrink films utilizing linear low density polyethylene or linear medium density polyethylene resins as a constituent of a core and/or an intermediate layer in a multi-layer film.

BACKGROUND OF THE INVENTION

The present invention is directed to new and useful heat shrinkable film formulations. One distinguishing feature of a shrink film is the film's ability, upon exposure to a certain temperature, to shrink or, if restrained from shrinking, to generate shrink tension within the film.

The manufacture of shrink films, as is well known in the art, may be generally accomplished by extrusion of the resinous materials which have been heated to their flow or melting point from an extrusion die in tubular or planar form. After a post extrusion quenching to cool, the extrudate is then reheated to its orientation temperature range. The orientation temperature range for a given film will vary with the different resinous polymers and blends thereof which comprise the film. However, the orientation temperature range may generally be stated to be above room temperature and below the melting point of the film.

The terms "oriented" or "orientation" are used herein to describe the process and resultant product characteristics obtained by stretching and immediately cooling a resinous polymeric material which has been heated to its orientation temperature range so as to revise the molecular configuration of the material by physical alignment of the molecules to improve mechanical properties of the film such as, for example, shrink tension and orientation release stress. Both of these properties may be measured in accordance with ASTM D 2838-69 (reapproved 1975). When the stretching force is applied in one direction uniaxial orientation results. When the stretching force is applied in two directions biaxial orientation results. Orientation is also herein used interchangeably with "heat shrinkability" with these terms designating a material which has been stretched and set by cooling at its stretched dimensions. An oriented (i.e., heat shrinkable) material will tend to return to its original unstretched dimensions when heated to an appropriate temperature below its melting temperature range.

Returning to the basic process for manufacturing the film as discussed above, it can be seen that the film once extruded and initially quenched to cool is then reheated to its orientation temperature range and oriented. The stretching to orient may be accomplished in many ways such as, for example, by "blown bubble" techniques or "tenter framing". These terms are well known to those in the art and refer to orientation steps whereby the material is stretched in the cross or transverse direction (TD) and in the longitudinal or machine direction (MD). After being stretched, the film is rapidly cooled to quench and thus set or lock-in the oriented molecular configuration.

After locking-in the oriented molecular configuration the film may then be stored in rolls and utilized to tightly package a variety of items. In this regard, the product to be packaged is first enclosed in the heat shrinkable material by heat sealing the shrink film to itself where necessary. Thereafter, the enclosed product is subjected to elevated temperatures by, for example, passing the product through a hot air or hot water tunnel. This causes the film to shrink around the product to produce a tight wrapping that closely conforms to the contour of the product.

The above general outline for manufacturing films is not meant to be all inclusive since this process is well known to those in the art. For example, see U.S. Pat. Nos. 4,274,900; 4,229,241; 4,194,039; 4,188,443; 4,048,428; 3,821,182 and 3,022,543. The disclosures of these patents are hereby incorporated by reference.

Many variations on the above discussed general processing theme are available to those in the art depending upon the end use for which the film is to be put and the characteristics desired to be instilled in the film. For example, the molecules of the film may be cross-linked during processing to improve the films abuse resistance and other characteristics. Cross-linking and methods for cross-linking are well known in the art. Cross-linking may be accomplished by irradiating the film or, alternatively, may be accomplished chemically through the utilization of peroxides. Another possible processing variation is the application of a fine mist of silicone spray to the interior of the freshly extruded material to improve the further processability of the material. A method for accomplishing such internal application is disclosed in copending U.S. patent application Ser. No. 523,294 filed Aug. 15, 1983 which is a rule 1.62 continuation of U.S. application Ser. No. 289,018 filed in the U.S. Patent and Trademark Office on July 31, 1981, now abandoned, and hereby incorporated by reference.

The polyolefin family and, in particular, the polyethylene family of shrink films provides a wide range of physical and performance characteristics such as shrink force (the amount of force that a film exerts per unit area of its cross-section during shrinkage), the degree of free shrink (the reduction in linear dimension in a specified direction that a material undergoes when subjected to elevated temperatures while unrestrained), tensile strength (the highest force that can be applied to a unit area of film before it begins to tear apart), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under different types of storage conditions). Film characteristics play an important role in the selection of a particular film and they differ for each type of packaging application and for each package. Consideration must be given to the product size, weight, shape, rigidity, number of product components, other packaging materials which may be used along with the film, and the type of packaging equipment available.

In view of the many above discussed physical characteristics which are associated with polyethylene films and in further view of the numerous applications with which these films have already been associated and those to which they may be applied in the future, it is readily discernible that the need for ever improving any or all of the above described physical characteristics of these films is great and, naturally, ongoing.

OBJECTS OF THE INVENTION

Accordingly, it is a general object of the invention to provide a heat shrinkable polyolefin film that will be an improvement over those films already utilized in the prior art.

It is another object of the present invention to provide a polyolefin film having improved shrink tensions.

In another object of the present invention is to provide an improved polyolefin shrink film having improved optical qualities.

A still further object of the invention is to provide a polyolefin shrink film having a wide shrink temperature range.

Another object of the present invention is to provide an improved polyolefin shrink film having improved sealability.

Furthermore, yet another object of the present invention is to provide a polyolefin shrink film having improved resistance to tear propagation.

An even further object of the invention is to provide a polyolefin shrink film having an improved machineability.

Yet another object of the present invention is to provide an improved polyethylene shrink film which utilizes either a linear low density or a linear medium density polyethylene as a constituent of a core and/or an intermediate layer.

These and other objects are achieved by the polyolefin shrink film which is disclosed herein.

DEFINITIONS

Unless specifically set forth and defined or limited, the terms "polymer" or "polymer resin" as used herein generally include homopolymers, copolymers, terpolymers, block, graft polymers, random, and alternating polymers.

The term "melt flow" as used herein or "melt flow index" is the amount, in grams, of a thermoplastic resin which can be forced through a given orifice under a specified pressure and temperature within ten minutes as described in ASTM D 1238.

The term "core" or "core layer" as used herein means a layer in a multi-layer film which is enclosed on both sides by additional layers.

The term "skin" or "skin layer" as used herein means an outer (i.e., surface) layer of a multi-layer film.

The term "intermediate" or "intermediate layers" as used herein means a layer of a multi-layer film which is neither a core layer nor a skin layer.

The term "low density polyethylene" (LDPE) as used herein refers to homopolymers of ethylene having a density of from 0.910 to 0.925.

The term "linear low density polyethylene" (LLDPE) as used herein refers to a copolymer of ethylene and 8% or less of butene, octene or hexene having a density of from 0.910 to 0.925 and in which the molecules comprise long chains with few or no branches or cross-linked structures.

The term "linear medium density polyethylene" (LMDPE) as used herein refers to a copolymer of ethylene and less than 8% butene, octene or hexene having a density of from 0.926 to 0.940 and in which the molecules comprise long chains with few or no branches or cross-linked structures.

The term "ethylene vinyl acetate copolymer" (EVA) as used herein refers to a copolymer formed from ethylene and vinyl acetate monomers wherein the ethylene derived units are present in major amounts and the vinyl acetate derived units are present in minor amounts.

The term "ethylene propylene copolymer" (EPC) as used herein refers to a copolymer formed from ethylene and propylene monomers wherein the propylene derived units are present as a major constituent and the ethylene derived units are present as a minor constituent.

The term "proplyene homopolymer" (PP) as used herein refers to a thermoplastic resin having a density of approximately 0.90 and made by polymerizing propylene with suitable catalysts as is well known in the art.

SUMMARY OF THE INVENTION

It has been discovered that a flexible, heat shrinkable thermoplastic packaging film having a desirable combination of physical characteristics such as shrink tension, optical characteristics, cutability, sealability, shrink temperature range, and tear resistance has been achieved by the multi-layer flexible, thermoplastic packaging film of the present invention. This multi-layer film has a "core" layer that comprises a linear low density polyethylene resin. It is believed that linear medium density polyethylene resin may be substituted for the linear low density polyethylene resin. A preferred three layer embodiment also comprises, in addition to the above identified "core" layer, two skin layers each comprising a blend of a propylene homopolymer and an ethylene propylene copolymer. Preferably, the multi-layer film is oriented so that it is heat shrinkable in at least one direction.

The multi-layer film may be combined with other polymeric materials for specific applications. For instance, relatively thin layers may be added on either or both sides of the basic preferred three layer structure to improve seal strength or to lower gas and moisture permeability.

Another embodiment of the present invention envisions a five layered film structure. A preferred five layer structure comprises the same core and skin layers as the above discussed three layer structure and additionally includes two intermediate layers each comprising a blend of an ethylene vinyl acetate copolymer and either an ionomer resin, or a linear low density polyethylene. It is presently believed that a linear medium density polyethylene may also be substituted for the linear low density polyethylene of the intermediate layer.

BRIEF DESCRIPTION OF THE DRAWINGS

FIG. I is a cross sectional view of a preferred three layered embodiment of the present invention.

FIG. II is a cross sectional view of a preferred five layered embodiment of the present invention.

DESCRIPTION OF THE PREFERRED EMBODIMENTS

Referring to FIG. I, which is a cross sectional view of a three layered preferred embodiment of the present invention, it is seen that this embodiment comprises core layer 2 and skin layers 1 and 3. The preferred thickness ratio of the three layers of 1/3/1 is demonstrated in FIG. I. A preferred core layer 2 constituent comprises a linear low density polyethylene polymer. However, it is believed that linear medium density polyethylene polymer may be substituted as a core layer constituent without substantial alteration of the characteristics of the final film product. The core layer 2 comprises linear low density (alternately, linear medium density) polyethylene or the core layer 2 may comprise a copolymeric blend of linear low density (alternately, linear medium density) polyethylene with either an (a) ethylene propylene copolymer or (b) ethylene vinyl acetate copolymer or (c) ethylene vinyl acetate copolymer blended with an ionomer resin or (d) low density polyethylene. Thus the various blend formulations for core layer 2 may, in accordance with the present invention, be selected from the following groups.

(1) 10–100% LLDPE blended with from 0–90% EPC or
(2) 10–100% LMDPE blended with 0–90% EPC or
(3) 10–80% LLDPE blended with 20–90% EVA or
(4) 10–80% LMDPE blended with 20–90% EVA or
(5) 10–80% LLDPE blended with 10–80% EVA and 10–80% ionomer resin or
(6) 10–80% LMDPE blended with 10–80% EVA and 10–80% ionomer resin or
(7) 10–80% LLDPE blended with 20–90% LDPE or
(8) 10–80% LMDPE blended with 20–90% LDPE.

LLDPE is herein utilized as an abbreviation for linear low density polyethylene as defined above. LMDPE is herein utilized as an abbreviation for linear medium density polyethylene as defined above. EPC is herein used as an abbreviation for an ethylene propylene copolymer as defined above. EVA is herein utilized as an abbreviation for an ethylene vinyl acetate copolymer as defined above. The term ionomer resin is used herein to broadly describe the group of ionomer resins. One of the most notable of the ionomer resins is marketed under the trademark Surlyn by du Pont.

My experimentation has revealed that an especially preferred core layer formulation consists essentially of linear low density polyethylene. This material may be obtained from the Dow Chemical Company under the tradename Dowlex 2045.

Returning to FIG. I and, in particular, to skin layers 1 and 3, appropriate skin layer formulations may be selected from the following groups:

(1) EPC or
(2) 70–90% EPC blended with 10–30% PP or
(3) 70–90% EPC blended with 10–30% LLDPE or
(4) 70–90% EPC blended with 10–30% LMDPE.

All abbreviations are as stated above with regard to the core layer formulations. Additionally, PP is used herein as an abbreviation for a propylene homopolymer as defined above. Experimentation has also determined that a particularly preferred skin layer formulation consists essentially of a blend of 20% PP with 80% EPC.

The propylene homopolymer may be obtained from the Hercules Chemical Company under the trade designation PD064. The ethylene propylene copolymer may be obtained from the Soltex Chemical Company under the trade designation 42X01 or alternatively, from the Solvay Chemical Company under the trade designation KS400.

Throughout this specification and claims all percentages are "by weight" percentages.

Throughout the specification and claims all references to density are in gm/cc.

In summary, my experimentation has determined that a particularly preferred embodiment of the present invention comprises a core layer consisting essentially of linear low density polyethylene and skin layers consisting essentially of a blend of 20% of propylene homopolymer with 80% ethylene propylene copolymer.

Although the above-discussed three layer formulations are generally preferred over structures having more than three layers as a result of the economics of manufacture, I have also produced various five layer formulations which are also satisfactory from a physical characteristics point of view. However, the cost of manufacturing a five layer film is generally greater than that of a three layer film.

FIG. II, which is a cross sectional view of a preferred five layer film of the present invention, demonstrates the preferred layer thickness ratio of 2/2/1/2/2. The core layer 6 may comprise any of the core layer formulations discussed above with regard to the core layer 2 of the three layer embodiment. Additionally, the core layer may consist essentially of either (1) an ethylene propylene copolymer (EPC) or (2) an ethylene vinyl acetate copolymer (EVA).

The skin layers 4 and 8 of the five layer embodiment may comprise any of the skin layer formulations discussed above with regard to the skin layers 1 and 3 of the three layered embodiment of FIG. I.

The five layered embodiment of FIG. II also includes intermediate layers 5 and 7. These intermediate layers may comprise any of the formulations disclosed above with regard to core layer 2 of the three layer embodiment. Additionally, the formulation of the intermediate layers 5 and 7 may be selected from the following additional groups.

(1) EVA or
(2) 20–80% LLDPE blended with 20–80% ionomer resin or
(3) 20–80% LMDPE blended with 20–80% ionomer resin.

My experimentation has revealed that a particularly preferred five layer structure will comprise skin layers 4 and 8 which consist essentially of an ethylene propylene copolymer (EPC), intermediate layers 5 and 7 consisting essentially of a blend of 90% ethylene vinyl acetate copolymer with 10% ionomer resin and a core layer 6 consisting essentially of a linear low density polyethylene. The EPC may be obtained from the Soltex Chemical Company under the trade designation 42X01. The EVA may be obtained from the du Pont Chemical Company under the trade designation Alathon 3137. The ionomer resin may be obtained from the du Pont Chemical Company under the Surlyn trademark and has trade designation Surlyn 1601. The LLDPE may be obtained from the Dow Chemical Company under the trade designation Dowlex 2045.

Those skilled in the art will readily recognize that all of the above disclosed, by weight, percentages are subject to slight variation. Additionally, these percentages may vary slightly as a result of the inclusion or application of additives such as the silicon mist discussed above or agents such as slip and anti-block agents. A preferred anti-block agent is silica which is available from Johns Manville under the tradename White Mist. Preferred slip agents are Erucamide (available from Humko Chemical under the tradename Kemamide E), and Stearamide (available from the Humko Chemical Company under the trade name Kemamide S) and, N, N' Dioleoylethylenediamine (available from Glyco Chemical under the tradename Acrawax C). A preferred Silicon spray is a liquid polyorganosiloxane manufactured by General Electric under the trade designation General Electric SF18 polydimethylsiloxane.

The general ranges for application of these additives are as follows:

(1) Silica—250-3000 PPM
(2) Acrawax C: 200-4000 PPM
(3) Erucamide: 200-5000 PPM
(4) Stearamide: 200-5000 PPM
(5) Silicon Spray: 0.5 mgft$^2$—and up.

When utilized within the specification and claims of the instant application the term "consisting essentially of" is not meant to exclude slight percentage variations or additives and agents of this sort.

Additional layers and/or minor amounts of additives of the types described above may be added to either the 3-layer or 5-layer structure of the present invention as desired but care must be taken not to adversely alter the desirable shrink tensions, shrink properties, optics and other characteristics of the multi-layer film of the present invention.

In the preferred process for making the multi-layer linear low or linear medium density polyethylene shrink film of the present invention the basic steps are blending the polymers for the various layers, coextruding the layers to form a multi-layer film, and then stretching the film to biaxially orient. These steps and additional desirable steps will be explained in detail in the paragraphs which follow.

The process begins by blending the raw materials (i.e. polymeric resins) in the proportions and ranges desired as discussed above. The resins are usually purchased from a supplier in pellet form and can be blended in any one of a number of commercially available blenders as is well known in the art. During the blending process any additives and/or agents which are desired to be utilized are also incorporated.

The blended resins and applicable additives and/or agents are then fed into the hoppers of extruders which feed the coextrusion die. For the three-layer film at least three extruders need to be employed if each layer is to have a different composition. Two extruders are fed the materials desirable for the inner and outer skin layers and the other extruder is fed the linear low or linear medium density polyethylene material which is desired for utilization in the core layer. Additional extruders may be employed, if desired. Preferably the materials are coextruded as a tube having a diameter which is dependent on the racking ratio and desired final diameter. This coextruded tube is relatively thick and is referred to as the "tape". Circular coextrusion dies are well known in the art and can be purchased from a number of manufacturers. In addition to tubular coextrusion, slot dies could be used to coextrude the material in planar form. Well known single or multi-layer extrusion coating processes could also be employed if desired.

An additional process step which may be utilized is to irradiate the tape or unexpanded tubing or sheet by bombarding it with high-energy electrons from an accelator to cross-link the materials of the tape. Cross-linking greatly increases the structural strength of the film or the force at which the material can be stretched before tearing apart when the film materials are predominately ethylene such as polyethylene or etheylene-vinyl acetate. Irradiation also improves the optical properties of the film and changes the properties of the film at higher temperatures. If an irradiation step is employed a preferred irradiation doseage level is in the range of 0.5 MR to 12.0 MR. MR is an abbreviation for megarads. A megarad is $1 \times 10^6$ rads with a rad being the quantity of ionizing irradiation that results in the absorption of 100 ergs of energy per gram of irradiated material regardless of the source of the radiation. In some instances, it may be desirable to stetch the multi-layer film first and then irradiate it, or, if sequential coating is employed one layer or a group of layers could be irradiated and then another layer or layers could be added before the final step of stretching and orienting.

As stated above, an additional optional process step is the application of a fine silicon spray to the interior of the newly extruded tape. The details of this process step are disclosed in U.S. patent application Ser. No. 523,294 filed Aug. 15, 1983 which is a rule 1.62 continuation of U.S. application Ser. No. 289,018 filed on July 31, 1981 now abandoned, and hereby incorporated by reference.

Following coextrusion, quenching to cool, and if desired irradiation, the extruded tape is reheated and is continuously inflated by internal air pressure into a bubble thereby transforming the narrow tape with thick walls into a wide film with thin walls of the desired film thickness. This process is sometimes referred to as the "trapped bubble technique" of oriention or as "racking". After stretching, the bubble is then deflated and the film is wound onto semi-finished rolls called "mill rolls". The racking process orients the film, by stretching it transversely and, to some extent, longitudinally to rearrange the molecules and thus impart shrink capabilities to the film and modify the film's physical characteristics. Additional longitudinal or machine direction stretching may be accomplished by revolving the deflate rollers which aid in the collapsing of the "blown bubble" at a speed greater than that of the rolls which serve to transport the reheated "tape" to the racking or blown bubble area. All of these methods of orientation are well known in the art.

To further disclose and clarify the scope of my invention to those skilled in the art the following examples are presented.

EXAMPLE I

A five layered structure having an approximate layer thickness ratio of 2/2/1/2/2 was extruded by supplying four extruders. Extruder No. 1 which supplied the die orifices for both intermediate layers was provided with a blend of 90% ethylene vinyl acetate copolymer (12% vinyl acetate) [Alathon 3137 (Melt Index 0.5)] and 10% ionomer resin [Surlyn 1601 (0.940 density, Melt Index 1.4)]. The blend also contained 1100 PPM Erucamide [Kemamide E] and 1100 PPM Stearamide [Kemamide S]. Extruder No. 2 which supplied the die orifice for the core layer was provided with 100% linear low density polyethylene [Dowlex 2045 (0.920 density, Melt Index 1.0)]. Extruders No. 3 and 4 each supplied a die orifice for a skin layer and both were provided with 100% ethylene propylene copolymer (3.5% ethylene) [Soltex 42X01 (Melt Flow 4.5)] having blended therewith 1100 PPM Erucamide [Kemamide E], 1100 Stearamide [Kemamide S], and 1100 PPM silica [White Mist].

Extruder No. 1 was maintained at a temperature range of from 390°-425° F. Extruder No. 2 was maintained at a temperature range of from 410°-470° F. Extruder No. 3 was maintained at a temperature range of from 350°-370° F. and Extruder No. 4 was maintained at a temperature range of from 345°-365° F. The circular die was maintained at a temperature range of from 390°-435° F.

After extrusion of the layers through the 10 inch circular die orifice the tubular extrudate which had a tape thickness of approximately 15 mil. and a tubular width of approximately 9⅝" was quenched to cool by passing through a cold water bath at approximately 37 feet per minute. The tube was then reheated to orient by passing through a heating zone or oven at 38 feet per minute. The oven was heated by horizontal, vertical, and steam heating elements. In this example the horizontal heating element was maintained at 200° F. The vertical heating elements was maintained at 300° F. and the steam element, which supplied heat by being passed through pipes or cans located within the oven, was supplied with steam at 2 p.s.i.

After being heated as described above, the tubular extrudate was inflated and transversely stretched approximately to 4.8 to 1 and longitudinally stretched approximately 4.3 to 1. Thereafter the film was cooled by water quenching to lock-in the oriented structure. Final film gauge was approximately 75 gauge.

The experimental data which was obtained for this film formulation is reported in Table I which follows the description of the remaining examples.

EXAMPLE II

A five layered structure having an approximate layer thickness ratio of 2/2/1/2/2 was extruded by supplying four extruders. Extruder No. 1 which supplied the die orifices for both intermediate layers was provided with a blend comprising 50% ethylene vinyl acetate copolymer (12% vinly acetate) [Alathon 3137 (Melt Index 0.5)] and 50% linear low density polyethylene [Dowlex 2045 (0.920 density, Melt Index 1.0)] also having 1100 PPM Erucamide [Kemamide E]. Extruder No. 2 which supplied the die orifice for the core layer was provided with 100% linear low density polyethylene [Dowlex 2045 (0.920 density, Melt Index 1.0)]. Extruders No. 3 and 4 each supplied a die orifice for a skin layer and both were provided with 100% ethylene propylene copolymer (2.7% ethylene) [ARCO K-193 (Melt Flow 2.3)] having 1100 PPM Erucamide [Kemamide E] and 1100 PPM silicon [White Mist].

Extruder No. 1 was maintained at a temperature range of from 405° to 415° F. Extruder No. 2 was maintained at a temperature range of from 400°–475° F. Extruder No. 3 was maintained at a temperature range of from 355°–435° F. and Extruder No. 4 was maintained at a temperature from 355°–410° F. The circular die was maintained at a temperature range of from 390°–425° F.

After extrusion of the layers through the 10" circular die orifice the tubular extrudate having an approximate tape width of 8¾" and thickness of 17 mil and was quenched to cool by passing through a cold water bath at approximately 39 feet per minute. The tubular extrudate was then reheated to orient by passing through a heating zone or oven at approximately 38 feet per minute. The oven was heated by horizontal, vertical and steam elements. In this example the horizontal heating element was maintained at 212° F. The vertical heating element was maintained at 343° F. and the steam element, which supplied heat by being passed through pipes or cans located within the oven, was supplied at 7 psi.

After being heated the tubular extrudate was inflated and transversely stretched approximately 4.8 to 1 and longitudinally stretched approximately 4.5 to 1. Thereafter the film was cooled by water quenching to lock-in the oriented molecular structure. Final film thickness was approximately 75 gauge.

The data obtained upon testing of this material is located in Table I below.

EXAMPLE III

A three layered structure having an approximate layer thickness ratio of 1/3/1 was extruded by supplying 4 extruders. Extruders number 1 and 2 which supplied the die orifice for the core layer were provided with 100% linear low density polyethylene [Dowlex 2045 (0.920 density, Melt Index 1.0)] having 3300 PPM Erucamide [Kemamide E]. Extruders No. 3 and 4 each supplied a die orifice for a skin layer and both were provided with a blend of 80% ethylene propylene copolymer (3.5% ethylene) [Soltex 42X01 (Melt Flow 4.5)] and 20% propylene homopolymer [Hercules PD064 (0.906 density, Melt Flow 3.5)] and having 3300 PPM Erucamide [Kemamide E] and 1100 PPM silica [White Mist] and 1650 PPM Acrawax C.

The temperature of extruder number 1 was set in the temperature range of from 395°–485° F. Extruder number 2 was set in the temperature range of from 425°–470° F. Extruder number 3 was set in the temperature range of from 370°–375° F. Extruder number 4 was set in the temperature range of from 370°–375° F. The circular die was set at a temperature of 385° F. The actual temperature ranges at which the extruders and die were maintained were not recorded for this example.

After extrusion of the layers through the 10 inch circular die orifice the tubular extrudate was quenched to cool by passing through a cold bath at approximately 39.5 feet per minute. Upon extrusion of the tape a fine silicon mist was applied to the interior of the extruded tube at the rate of 5-7 mg. ft.$^2$. The cooled tubular extrudate was then reheated to orient by passing through a heating zone or oven at approximately 37.7 feet per minute. The oven was heated by a horizontal, vertical and steam heating elements. In this example the horizontal element was maintained at 200° F. The vertical element was maintained at 305° F. and the steam element, which supplied heat by being passed through pipes or cans located within the oven, was supplied at 3.5 p.s.i.

After being heated the tubular extrudate was transversely stretched approximately 4.8 to 1 and longitudinally stretched approximately 4.5 to 1. Thereafter the film was cooled by water quenching to lock-in the oriented structure. Final film gauge was approximately 75 gauge.

The data obtained upon testing this film is tabulated in Table I below.

TABLE I

| Example | I | II | III |
|---|---|---|---|
| Layer Ratio | 2/2/1/2/2 | 2/2/1/2/2 | 1/3/1 |
| Tensile Strength × 100 (PSI)[1] | | | |
| MD | 97.1 | 125.2 | 124.6 |
| TD | 110.5 | 105.1 | 130.7 |
| Elongation (%)[2] | | | |
| MD | 86 | 98 | 113 |
| TD | 65 | 107 | 102 |
| Modulus × 1000 (PSI)[3] | | | |
| MD | 90.3 | 98.3 | 96.5 |
| TD | 101.4 | 99.4 | 97.6 |
| Tear Propagation (gms.)[4] | | | |
| MD | 4.10 | 4.33 | 9.60 |
| TD | 4.01 | 5.53 | 9.83 |
| Tear Resistance (lbs.)[5] | | | |
| MD | 0.70 | 0.61 | 0.60 |
| TD | 0.90 | 0.83 | 0.67 |
| Shrink Properties | | | |

TABLE I-continued

| Example | I | II | III |
|---|---|---|---|
| at 200° F. | | | |
| Free Shrink (%)[6] | | | |
| MD | 16 | 14 | 12 |
| TD | 18 | 20 | 17 |
| Shrink Tension (PSI)[7] | | | |
| MD | 239 | 304 | 288 |
| TD | 327 | 457 | 509 |
| At 260° F. | | | |
| Free Shrink (%)[6] | | | |
| MD | 52 | 49 | 48 |
| TD | 57 | 57 | 54 |
| Shrink Tension (PSI)[7] | | | |
| MD | 220 | 345 | 434 |
| TD | 365 | 422 | 538 |
| at 280° F. | | | |
| Free Shrink (%)[6] | | | |
| MD | 71 | 66 | 62 |
| TD | 67 | 68 | 64 |
| Shrink Tension (PSI)[7] | | | |
| MD | 237 | 348 | 432 |
| TD | 304 | 362 | 584 |
| Optics[8] | | | |
| Haze (%) | 2.5 | 2.1 | 2.0 |
| Gloss (45°) | 94 | 88 | 88 |
| Total Transmission | 92.5 | 92.2 | 92.2 |

Footnote to Table I
[1]ASTM D 882
[2]ASTM D 882
[3]ASTM D 882
[4]ASTM D 1938
[5]ASTM D 1004
[6]ASTM D 2732
[7]ASTM D 2838
[8]ASTM D 1003

All of the above tabulated Table I data are averages obtained by procedures in accordance with the designated ASTM standard.

It should be understood that the detailed description and specific examples which indicate the presently preferred embodiments of the invention are given by way of illustration only since various changes and modifications within the spirit and scope of the invention will become apparent to those of ordinary skill in the art upon review of the above detailed description and examples.

In view of the above:

We claim:

1. A multi-layer film comprising:
    a core layer comprising linear low density polyethylene or linear medium density polyethylene;
    two skin layers comprising a blend of from 70% to 90%, by weight, of an ethylene propylene copolymer and from 10% to 30%, by weight, of a propylene homopolymer; and
    wherein said film has an average machine direction free shrink at 200° F. of at least about 12% and an average transverse direction free shrink at 200° F. of at least about 17%.

2. The film of claim 1 further comprising two intermediate layers comprising a blend of about 90%, by weight, of an ethylene vinyl acetate copolymer and about 10%, by weight, of an ionomer resin.

3. The film of claim 1 further comprising two intermediate layers comprising a blend of from 20% to 90%, by weight, of an ethylene vinyl acetate copolymer and from 10% to 80%, by weight, of linear low density polyethylene.

4. The film of claim 1 wherein said film consists of three layers.

5. The film of claim 1 wherein said two skin layers consist essentially of a blend of about 80%, by weight, of an ethylene propylene copolymer with about 20%, by weight, of a propylene homopolymer.

6. A multi-layer film comprising:
    a core layer comprising linear low density polyethylene or linear medium density polyethylene;
    two skin layers comprising an ethylene propylene copolymer; and
    wherein said film has an average machine direction free shrink at 200° F. of at least about 12% and an average transverse direction free shrink at 200° F. of at least about 17%.

7. The film of claim 6 further comprising two intermediate layers comprising a blend of about 90%, by weight, ethylene vinyl acetate copolymer and about 10%, by weight, of an ionomer resin.

8. The film of claim 6 further comprising two intermediate layers comprising a blend of from 20% to 90%, by weight, of an ethylene vinyl acetate copolymer and 10% to 80%, by weight, of linear low density polyethylene.

9. The film of claim 6 wherein said skin layers comprise a blend of about 80%, by weight, of an ethylene propylene copolymer with about 20%, by weight, of a propylene homopolymer.

10. The film of claims 1 or 6 wherein the core layer comprises a formulation selected from one of the following groups:
    a. 10–100%, by weight, of a linear low density polyethylene and from 0–90%, by weight, of an ethylene propylene copolymer;
    b. 10–100%, by weight, of a linear medium density polyethylene and from 0–90%, by weight, of an ethylene propylene copolymer;
    c. 10–80%, by weight, of a linear low density polyethylene and from 20–90%, by weight, of an ethylene vinyl acetate copolymer;
    d. 10–80%, by weight, of a linear medium density polyethylene and from 20–90%, by weight, of an ethylene vinyl acetate copolymer;
    e. 10–80%, by weight, of a linear low density polyethylene and from 10–80%, by weight, of an ethylene vinyl acetate copolymer and from 10–80%, by weight, of an ionomer resin;
    f. 10–80, by weight, of a linear medium density polyethylene and from 10–80%, by weight, of an ethylene vinyl acetate copolymer and from 10–80%, by weight, of an ionomer resin;
    g. 10–80%, by weight, of a linear low density polyethylene and from 20–90%, by weight, of a low density polyethylene;
    h. 10–80%, by weight, of a linear medium density polyethylene and from 20–90%, by weight, of a low density polyethylene.

11. The film of claims 1 or 6 further comprising an intermediate layer comprising a formulation selected from one of the following groups:
    a. 10–100%, by weight, of a linear low density polyethylene and from 0–90%, by weight, of an ethylene propylene copolymer;
    b. 10–100%, by weight, of a linear medium density polyethylene and from 0–90%, by weight, of an ethylene propylene copolymer;
    c. 10–80%, by weight, of a linear low density polyethylene and from 20–90%, by weight, of an ethylene vinyl acetate copolymer;
    d. 10–80%, by weight, of a linear medium density polyethylene and from 20–90%, by weight, of an ethylene vinyl acetate copolymer;

e. 10–80%, by weight, of a linear low density polyethylene and from 10–80%, by weight, of an ethylene vinyl acetate copolymer and from 10–80%, by weight, of an ionomer resin;

f. 10–80%, by weight of a linear medium density polyethylene and from 10–80%, by weight, of an ethylene vinyl acetate copolymer and from 10–80%, by weight, of an ionomer resin;

g. 10–80%, by weight, of a linear low density polyethylene and from 20–90%, by weight, of a low density polyethylene;

h. 10–80%, by weight, of a linear medium density polyethylene and from 20–90%, by weight, of a low density polyethylene;

i. an ethylene vinyl acetate copolymer;

j. 20–80%, by weight, linear low density polyethylene and from 20–80%, by weight, of an ionomer resin;

k. 20–80%, by weight, linear medium density polyethylene and from 20–80%, by weight, of an ionomer resin.

12. The film of claim 6 wherein said film consists of three layers.

13. The film of claim 6 wherein the skin layers comprise a formulation selected from one of the following groups:

a. 70–90%, by weight, of an ethylene propylene copolymer and from 10–30%, by weight, of a linear low density polyethylene;

b. 70–90%, by weight, of an ethylene propylene copolymer and from 10–30%, by weight, of a linear medium density polyethylene.

14. The film of claims 1 or 6, wherein the film is heat shrinkable.

* * * * *